US012523507B2

(12) United States Patent
Teboulle et al.

(10) Patent No.: US 12,523,507 B2
(45) Date of Patent: Jan. 13, 2026

(54) METHOD OF DETECTING AND LOCATING A FLUID LEAK

(71) Applicant: SAGEMCOM ENERGY & TELECOM SAS, Rueil Malmaison (FR)

(72) Inventors: Henri Teboulle, Rueil Malmaison (FR); Abbas Sabraoui, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 565 days.

(21) Appl. No.: 17/225,838

(22) Filed: Apr. 8, 2021

(65) Prior Publication Data

US 2021/0318152 A1 Oct. 14, 2021

(30) Foreign Application Priority Data

Apr. 9, 2020 (FR) ...................................... 2003584

(51) Int. Cl.
G01F 1/66 (2022.01)
G01M 3/24 (2006.01)

(52) U.S. Cl.
CPC ............ *G01F 1/666* (2013.01); *G01M 3/243* (2013.01)

(58) Field of Classification Search
CPC ................................ G01F 1/666; G01M 3/243
USPC .................................. 73/40.5 A, 40.5 R, 592
See application file for complete search history.

(56) References Cited

U.S. PATENT DOCUMENTS

| 4,435,974 | A | * | 3/1984 | Fuchs | G01M 3/243 73/40.5 A |
| 5,058,419 | A | * | 10/1991 | Nordstrom | G01M 3/243 367/125 |
| 5,349,568 | A | * | 9/1994 | Kupperman | G01M 3/243 367/172 |
| 5,416,724 | A | * | 5/1995 | Savic | G01M 3/24 702/54 |
| 5,544,074 | A | * | 8/1996 | Suzuki | G01M 3/243 73/861.26 |

(Continued)

FOREIGN PATENT DOCUMENTS

| CA | 2872289 A1 * | 5/2015 | ............. F17D 5/005 |
| EP | 3236227 A2 | 10/2017 | |

(Continued)

*Primary Examiner* — John Fitzgerald
(74) *Attorney, Agent, or Firm* — MUNCY, GEISSLER. OLDS & LOWE, P.C.

(57) ABSTRACT

A method of detecting and locating a leak, the method comprising, for each ultrasonic fluid meter, the following steps of, acquiring or evaluating noise levels, each associated with a respective different detection period, each noise level being representative of the level of a leakage noise signal contained in the measurement samples coming from measurements taken by the transducer of said ultrasonic fluid meter during the associated detection period; comparing each noise level with a noise threshold; and detecting that a fluid leak is present in the proximity of the ultrasonic fluid meter on detecting at least a predetermined number of successive noise levels that are greater than the predetermined noise threshold and that correspond to detection periods that are spaced apart in time by at least a predetermined duration.

6 Claims, 2 Drawing Sheets

(56) References Cited

U.S. PATENT DOCUMENTS

| | | | | |
|---|---|---|---|---|
| 5,922,942 | A * | 7/1999 | Roy | G01M 3/243 |
| | | | | 73/592 |
| 6,267,000 | B1 * | 7/2001 | Harper | G01M 3/243 |
| | | | | 73/40 |
| 6,530,263 | B1 * | 3/2003 | Chana | F17D 5/06 |
| | | | | 73/40.5 R |
| 7,007,545 | B1 * | 3/2006 | Martinek | G01M 3/243 |
| | | | | 73/49.1 |
| 8,665,101 | B2 * | 3/2014 | Solomon | G01F 1/66 |
| | | | | 73/152.58 |
| 9,766,151 | B2 * | 9/2017 | Hoshuyama | G01C 21/3407 |
| 9,939,344 | B2 * | 4/2018 | Bracken | G01M 3/243 |
| 10,209,225 | B2 * | 2/2019 | Perrier | G01M 3/00 |
| 10,509,012 | B2 * | 12/2019 | Perrier | G01N 29/07 |
| 10,527,515 | B2 * | 1/2020 | Brennan, Jr. | G01M 3/2807 |
| 10,551,274 | B2 * | 2/2020 | Cole | H04B 17/21 |
| 10,565,752 | B2 * | 2/2020 | Perrier | G06T 11/001 |
| 10,859,212 | B2 * | 12/2020 | Jalilian | E21B 47/107 |
| 10,921,288 | B2 * | 2/2021 | Nielsen | G01N 29/50 |
| 10,942,080 | B2 * | 3/2021 | Bailey | G01K 1/143 |
| 10,948,132 | B2 * | 3/2021 | Lander | H04W 56/0015 |
| 11,209,333 | B2 * | 12/2021 | Bailey | G01K 1/143 |
| 11,262,269 | B2 * | 3/2022 | Davidson | G01M 3/2807 |
| 11,280,696 | B2 * | 3/2022 | Barker | G01M 3/2815 |
| 11,281,203 | B2 * | 3/2022 | Cussonneau | G05B 13/041 |
| 11,788,919 | B2 * | 10/2023 | Kann | G06Q 50/06 |
| | | | | 73/40.5 A |
| 11,852,609 | B2 * | 12/2023 | Nielsen | G01M 3/243 |
| 2012/0007743 | A1 * | 1/2012 | Solomon | G01M 3/2807 |
| | | | | 702/51 |
| 2012/0285221 | A1 * | 11/2012 | Al-Qahtani | G01M 3/246 |
| | | | | 73/40.5 A |
| 2013/0214936 | A1 * | 8/2013 | Schuberth | G08B 5/22 |
| | | | | 340/870.03 |
| 2014/0121999 | A1 * | 5/2014 | Bracken | G01M 3/243 |
| | | | | 702/51 |
| 2014/0174186 | A1 * | 6/2014 | Salomon | G01M 3/24 |
| | | | | 73/587 |
| 2015/0276539 | A1 * | 10/2015 | Hoshuyama | G01M 3/00 |
| | | | | 73/49.1 |
| 2017/0307466 | A1 * | 10/2017 | Brennan, Jr. | G01F 1/666 |
| 2018/0306753 | A1 * | 10/2018 | Perrier | G01N 29/043 |
| 2018/0306755 | A1 * | 10/2018 | Perrier | G01N 29/2475 |
| 2018/0308265 | A1 * | 10/2018 | Perrier | G06T 11/001 |
| 2019/0033261 | A1 * | 1/2019 | Nielsen | G01N 29/50 |
| 2019/0128766 | A1 * | 5/2019 | Burtea | G06F 17/40 |
| 2019/0128767 | A1 | 5/2019 | Burtea | |
| 2019/0128848 | A1 * | 5/2019 | Perrier | G01M 3/243 |
| 2019/0137353 | A1 * | 5/2019 | Cole | H04B 17/21 |
| 2020/0300679 | A1 * | 9/2020 | Kroemer | G01F 1/662 |
| 2021/0003531 | A1 * | 1/2021 | Nielsen | G01D 4/00 |
| 2021/0262886 | A1 * | 8/2021 | Mataga | G01M 3/243 |
| 2022/0326107 | A1 * | 10/2022 | Dupont | E03B 7/003 |
| 2022/0334020 | A1 * | 10/2022 | Ghazavi | G01M 3/38 |
| 2023/0008984 | A1 * | 1/2023 | Dupont | G01M 3/243 |
| 2023/0111271 | A1 * | 4/2023 | Kann | G01M 3/2815 |
| | | | | 73/40.5 A |

FOREIGN PATENT DOCUMENTS

| | | | | |
|---|---|---|---|---|
| GB | 2367362 A | * | 4/2002 | G01M 3/24 |
| JP | 2006349572 A | | 12/2006 | |
| JP | 2012159379 A | * | 8/2012 | |
| WO | WO-2011157685 A1 | * | 12/2011 | G01M 3/243 |
| WO | WO2017005269 A1 | | 1/2017 | |

* cited by examiner

METHOD OF DETECTING AND LOCATING A FLUID LEAK

BACKGROUND OF THE INVENTION

Modern water meters, known as "smart meters", are progressively replacing traditional water meters.

A smart water meter is naturally capable of measuring the quantity of water consumed by the installation of a client in order to bill the client for that consumption. A smart water meter is also capable of producing, transmitting, receiving, and analyzing various kinds of data (e.g. relating to the consumption of the installation, to the state of the water distribution network, or indeed to the operation of the meter), so as to be able to perform new functions. These new functions are beneficial simultaneously for the water distributor, for the network operator, and for the client.

By way of example, a smart water meter thus enables the client to improve monitoring of the client's consumption and thus to control it better, to optimize billing, and to avoid being disturbed by the visits of meter readers because of remote reading.

Proposals have been made to use the new capabilities of smart water meters to improve detecting and locating of water leaks in water distribution networks.

Object of the Invention

An object of the invention is to detect and locate a fluid leak occurring in a fluid distribution network, and to do so in a manner that is accurate, reliable, and inexpensive.

SUMMARY OF THE INVENTION

In order to achieve this object, there is provided a method of detecting and locating a fluid leak in a fluid distribution network that includes a plurality of ultrasonic fluid meters, each fluid meter including at least one transducer, the method comprising, for each ultrasonic fluid meter, the following steps:
  acquiring or evaluating noise levels, each associated with a respective different detection period, each noise level being representative of the level of a leakage noise signal contained in the measurement samples coming from measurements taken by the transducer of said ultrasonic fluid meter during the associated detection period;
  comparing each noise level with a predetermined noise threshold;
  detecting that a fluid leak is present in the proximity of the ultrasonic fluid meter on detecting at least a predetermined number of successive noise levels that are greater than the predetermined noise threshold and that correspond to detection periods that are spaced apart in time by at least a predetermined duration.

The detecting and locating method of the invention thus makes use of the noise levels contained in the measurements taken by the transducers of the meters in order to detect and locate a leak of water.

Since fluid distribution networks generally include a large number of meters, a region is meshed relatively finely and a leak can be located in a manner that is very accurate.

The method of the invention serves to distinguish between a leak, which is a phenomenon that is continuous and long lasting, and pump noise, which is filtered out and eliminated by the method. This improves the reliability and with which leaks are detected by reducing the false detection rate.

The method of the invention can be performed by using the meter transducer that is also used for taking measurements of fluid consumption. There is therefore no need to fit meters with transducers that are dedicated to detecting and locating leaks. The method of the invention can thus be performed inexpensively.

There is also provided a method as described above, wherein each ultrasonic fluid meter includes an upstream transducer situated beside the fluid distribution network and a downstream transducer situated beside an installation that is fed with fluid by said fluid distribution network, and wherein the measurement samples used for performing the method comprise first measurement samples that come from measurements taken by the downstream transducer of said ultrasonic fluid meter.

There is also provided a method as described above, further comprising, when a leak is detected, a step of locating said leak as being in the fluid distribution network upstream from said ultrasonic fluid meter.

There is also provided a method as described above, wherein each ultrasonic fluid meter includes an upstream transducer situated beside the fluid distribution network and a downstream transducer situated beside an installation that is fed with fluid by said fluid distribution network, and wherein the measurement samples used for performing the method comprise second measurement samples that come from measurements taken by the upstream transducer of said ultrasonic fluid meter.

There is also provided a method as described above, further comprising, when a leak is detected, a step of locating said leak as being in said installation downstream from said ultrasonic fluid meter.

There is also provided a method as described above, wherein the detection periods are defined in such a manner that each detection period follows directly after a preliminary period of duration not less than a predefined duration, and during which the ultrasonic fluid meter measures a fluid consumption of zero.

There is also provided a method as described above, wherein the noise level for each detection period is evaluated by the following steps:
  applying digital bandpass filtering to the measurement samples of said detection period in order to obtain a filtered detection signal comprising filtered measurement samples;
  calculating the autocorrelation of the filtered detection signal.

There is also provided a method as described above, wherein the noise level over the detection period is evaluated by using the following formula:

$$M = \text{MAX over } k \left( \sum_{n=0}^{R} S_n \times S_{n-k} \right),$$

where M is the noise level, $S_n$ is the $n^{th}$ filtered measurement sample, $S_{n-k}$ is the $(n-k)^{th}$ filtered measurement sample, and R is an integer that is less than or equal to the number of measurement samples of the detection period.

There is also provided equipment comprising a first communication module and a first processor module arranged to perform the method as described above.

There is also provided equipment as described above, the equipment being an information system, or a gateway, or a data concentrator, or a district smart meter.

There is also provided a computer program including instructions for causing the above-described equipment to execute the steps of the above-described method.

There is also provided a computer readable storage medium, having stored thereon the above-described computer program.

There is also provided a method of detecting and locating a fluid leak in a fluid distribution network, the method being performed in an ultrasonic fluid meter including at least one transducer, the method comprising the following steps:

acquiring measurement samples coming from measurements taken by the transducer during detection periods;

for each detection period, evaluating a noise level representative of the level of a leakage noise signal contained in the measurement samples of said detection period;

transmitting the noise levels to external equipment so that said external equipment responds to the noise levels by seeking to detect a fluid leak in the proximity of the ultrasonic fluid meter.

There is also provided a method as described above, wherein the detection periods are defined in such a manner that each detection period follows directly after a preliminary period of duration not less than a predefined duration, and during which the ultrasonic fluid meter measures a fluid consumption of zero.

There is also provided a method as described above, wherein the noise level for each detection period is evaluated by the following steps:

applying digital bandpass filtering to the measurement samples of said detection period in order to obtain a filtered detection signal comprising filtered measurement samples;

calculating the autocorrelation of the filtered detection signal.

There is also provided a method as described above, wherein the noise level over the detection period is evaluated by using the following formula:

$$M = \text{MAX over } k \left( \sum_{n=0}^{R} S_n \times S_{n-k} \right),$$

where M is the noise level, $S_n$ is the $n^{th}$ filtered measurement sample, $S_{n-k}$ is the (n-k) th filtered measurement sample, and R is an integer that is less than or equal to the number of measurement samples of the detection period.

There is also provided an ultrasonic fluid meter comprising at least one transducer, a second communication module, and a second processor module arranged to perform the above-described method.

There is also provided a computer program including instructions for causing the above-described ultrasonic meter to execute the steps of the above-described method.

There is also provided a computer readable storage medium, having stored thereon the above-described computer program.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
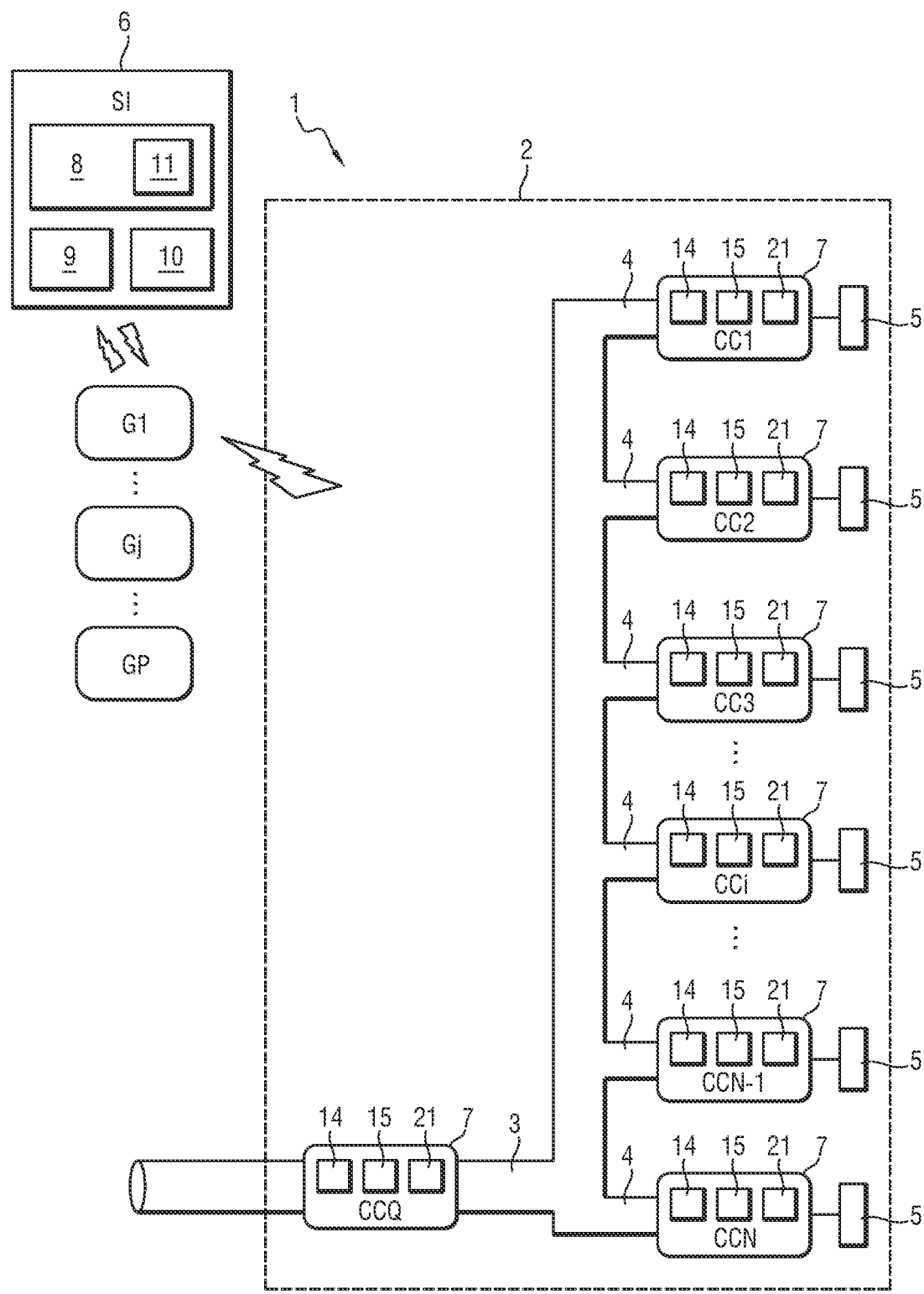
FIG. 1 shows a water distribution network in which the invention is implemented.

With reference to FIG. 1, the method of the invention for detecting and locating a fluid leak is implemented in this example in a water distribution network 1 for supplying water to a "district" 2, i.e. a geographical area having a plurality of water installations, each situated by way of example in a dwelling, in a restaurant, in a shop, etc.

The water distribution network 1 has a main pipe 3 and secondary pipes 4, each connected to a respective water installation 5.

The water distribution network 1 also has an information system (IS) 6 of the water distribution network manager, gateways Gj, and ultrasonic water meters 7.

The IS 6 has an application server 8, a long-range (LoRa) network server (LNS) 9, and a first communication module 10.

The application server 8 comprises a first processor module 11 comprising at least a first processor component adapted to execute instructions of a program for performing certain steps of the method described below for detecting and locating a water leak. By way of example, the first processor component may be a processor, a microcontroller, or indeed a programmable logic circuit such as a field programmable gate array (FPGA) or an application-specific integrated circuit (ASIC).

The LNS server 9 serves in particular to manage communications with all of the gateways Gj and with all of the water meters 7 to which the LNS server 9 is connected. The LNS server 9 communicates with the gateways Gj directly, and with the water meters 7 via the gateways Gj. In order to communicate with the gateways Gj and with the water meters 7, the LNS server 9 uses the first communication module 10, which in this example serves to perform radio communication transporting frames of the LoRa protocol.

The gateways Gj are LoRa gateways. The variable j lies in the range 1 to P.

Each gateway Gj comprises a communication module enabling it to communicate with the LNS server by radio communication that serves in this example to transport frames of the LoRa protocol.

All of the communication between the IS 6 and the water meters 7, whether uplink or downlink, passes via the gateways Gj.

In this example, the water meters 7 comprise a main water meter CCQ, which is a smart meter for the district, and a plurality of secondary water meters CCi, which are respective smart meters.

The main water meter CCQ is connected to the main pipe 3. A respective secondary water meter CCi is connected to each secondary pipe 4. The variable i varies over the range 1 to N, where N is the number of secondary pipes 4 and thus the number of secondary water meters CCi.

The secondary pipes 4 depend from the main pipe 3, i.e. they are all connected to the main pipe 3 downstream from the main water meter CCQ: downstream from the main water meter CCQ, the main pipe 3 divides into a bundle formed by the secondary pipes 4.

In this example, the term "upstream" means on the side of the water distribution network, and the term "downstream" means on the side of the water installations 5.

Each water meter 7 includes a second communication module 14 enabling it to communicate with the gateways Gj by radio communication, which in this example makes use of the LoRa protocol.

Each water meter 7 also includes a second processor module 15 including at least one second processor component adapted to execute instructions of a program for performing certain steps of the method described below for detecting and locating a water leak. By way of example, the second processor component may be a processor, a microcontroller, or indeed a programmable logic circuit such as an FPGA or an ASIC.

Each water meter 7 further includes a pipe through which there flows the water being supplied by the water distribution network 1 to the water installation 5 to which the water meter 7 is connected (or indeed the water installations 5, for the main meter CCQ), together with a measuring device 21 for measuring the speed of the water.

Figure 2:
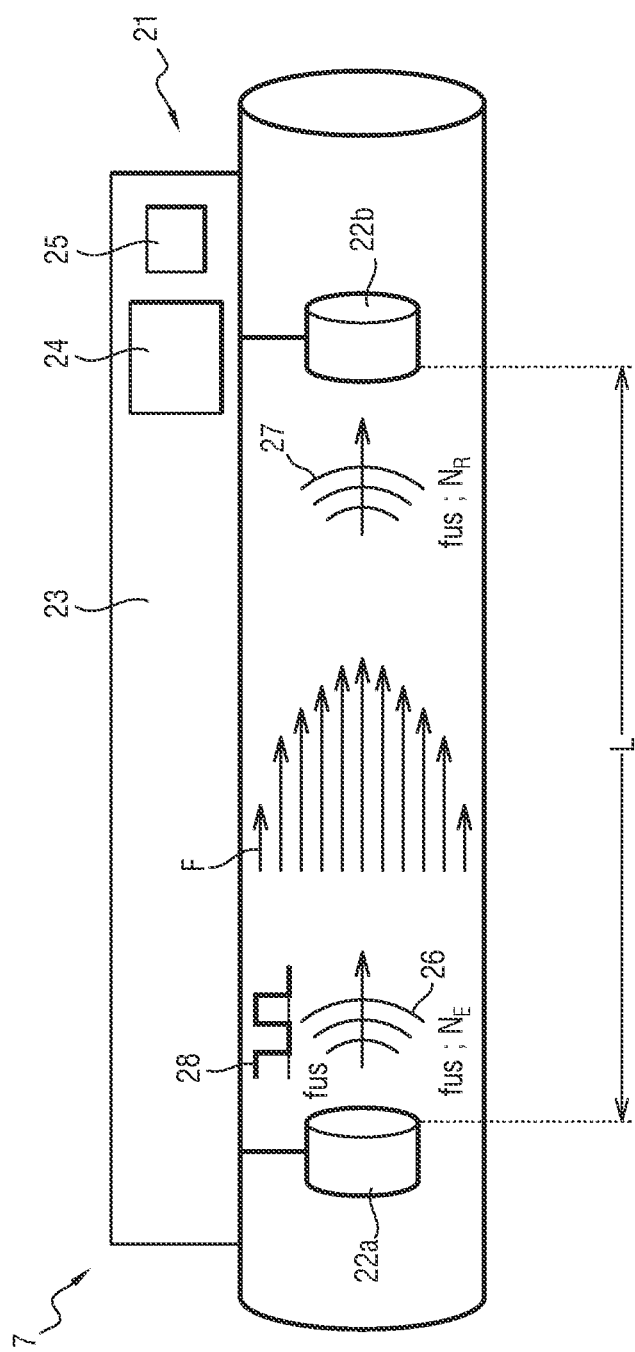
FIG. 2 shows an ultrasonic water meter of the water distribution network.

The measuring device 21 is visible in FIG. 2.

Water flows in the duct from upstream to downstream, as indicated by the direction of arrows F.

The measuring device 21 includes at least one transducer, and specifically an upstream transducer 22a and a downstream transducer 22b. The measuring device also includes a measurement module 23 connected to the upstream transducer 22a and to the downstream transducer 22b.

The upstream transducer 22a and the downstream transducer 22b are paired. In this example, the upstream transducer 22a and the downstream transducer 22b are piezoelectric transducers.

The measurement module 23 includes a third processor component 24, and also an analog-to-digital converter (ADC) 25, which may optionally be incorporated in the processor component 24.

The measurement module 23 controls the upstream transducer 22a and the downstream transducer 22b.

The upstream transducer 22a and the downstream transducer 22b each performs in succession the function of an emitter of emitted ultrasonic measurement signals 26 and the function of a receiver of received ultrasonic measurement signals 27.

The measurement module 23 generates an electrical excitation signal 28 and delivers the electrical excitation signal 28 to the emitter.

The emitter transforms the electrical excitation signal 28 into an emitted ultrasonic measurement signal 26. The measurement module 23 acquires the received ultrasonic measurement signal 27, which is received by the receiver.

The electrical excitation signal 28 has a frequency fus and a period Tus. The frequency fus conventionally lies in the range 900 kilohertz (kHz) to 4 megahertz (MHz), and in this example it is equal to 2 MHz. When the fluid is a gas and not water, it should be observed that the frequency fus is conventionally of the order of several tens of kilohertz.

Between the upstream transducer 22a and the downstream transducer 22b, the emitted ultrasonic measurement signal 26 thus travels along a path of defined length L from upstream to downstream (and then from downstream to upstream for the measurement where it is the transducer 22b that emits). In this example, the path of defined length is a rectilinear path between the upstream transducer 22a and the downstream transducer 22b.

In FIG. 2, the upstream transducer 22a is shown as performing the function of an emitter, and the downstream transducer 22b is shown as performing the function of a receiver. The electrical excitation signal 28 is thus applied as input to the upstream transducer 22a in order to emit the emitted ultrasonic measurement signal 26. The emitted ultrasonic measurement signal 26 thus follows the path of defined length L from upstream to downstream. The ultrasonic measurement signal 26 is emitted by the emitter at a level $N_E$. The received ultrasonic measurement signal 27 is received by the receiver at a level $N_R$ that is lower than the level $N_E$.

The measurement module 23 acquires the received ultrasonic measurement signal 27 after it has travelled through the water along the path of defined length. The measurement module 23 digitizes the received ultrasonic measurement signal 27 by using the ADC 25, and it produces measurement samples. For a signal of frequency fus=2 MHz, the sampling frequency is typically 8 MHz in order to comply with the Shannon criterion.

The measurement module 23 measures the travel time taken by the emitted ultrasonic signal 26 to travel along the path of defined length from upstream to downstream.

In reality, the measurement module 23 measures a global transfer time $T_{AB}$ from the upstream transducer 22a to the downstream transducer 22b.

The global transfer time $T_{AB}$ is such that:

$$T_{AB}=TA_A+\text{ToF}_{AB}+TR_B, \text{ where:}$$

$TA_A$ is a switch-on time of the upstream transducer 22a;

$\text{ToF}_{AB}$ corresponds to the time of flight taken by the emitted ultrasonic measurement signal 26 to travel along the path of defined length between the upstream transducer 22a and the downstream transducer 22b;

$TR_B$ is a reception time of the downstream transducer 22b.

Likewise, the downstream transducer 22b emits an ultrasonic measurement signal that is received by the upstream transducer 22a.

The measurement model 23 measures the global transfer time $T_{BA}$, which is such that:

$$T_{BA}=TA_B+\text{ToF}_{BA}+TR_A, \text{ where:}$$

$TA_B$ is a switch-on time of the downstream transducer 22b;

$\text{ToF}_{BA}$ corresponds to the time of flight taken by the ultrasonic measurement signal to travel along the path of defined length between the downstream transducer 22b and the upstream transducer 22a;

$TR_A$ is a reception time of the upstream transducer 22a.

Assuming that:

$TA_A=TA_B$ and $TR_A=TR_B$ (paired transducers), then the following is obtained:

$$\Delta T=T_{BA}-T_{AB}=\text{ToF}_{BA}-\text{ToF}_{AB}=D\text{ToF};$$

where DToF is the differential time-of-flight.

However, the DToF is proportional to the mean speed of the fluid, and the measurement module 23 then calculates the mean speed of the water using the DToF. The mean speed is signed and it may be positive, negative, or zero.

The measurement module 23 then deduces the mean speed of the water flowing in the pipe.

There follows a description of an implementation of the detecting and locating method of the invention.

In each water meter 7, the second processor module 15 acquires first measurement samples that come from the measurements taken by the downstream transducer 22b of the measuring device 21 of said water meter 7, and that are obtained by digitizing the received ultrasonic measurement signals 27 that have been received by the downstream transducer 22b.

The measurements in question are taken during detection periods that are spaced apart in time.

Thus, outside time periods of measuring flow rate, and in repeated manner over time, the water meter 7 wakes up, captures the first measurement samples during a detection period, and then goes back to sleep.

The detection periods are defined in such a manner that each detection period directly follows a preliminary period of duration not less than a predefined preliminary duration, during which the water consumption as measured by the water meter 7 is zero (or at least less than a predetermined threshold that is very low). The preliminary periods are "zero-flow" periods during which the speed of the water and thus its flow rate are zero.

In this example, each detection period has a duration equal to 5 seconds (s). In this example, the predefined preliminary duration is equal to 5 s. The sampling frequency at which the first measurement samples are acquired is typically equal to 50 kHz.

The second processor module 15 of the water meter 7 evaluates noise levels, each associated with a respective different detection period. Each noise level is representative of the level of a leakage noise signal contained in the first measurement samples coming from measurements taken by the downstream transducer 22b of the water meter 7 during the associated detection period. If a water leak occurs in the proximity of the water meter 7, the noise level is high.

All of the water meters 7 transmit the noise levels to external equipment, specifically to the IS 6 via the gateways Gj, by using the LoRa protocol.

The first processor module 11 of the application server 8 of the IS 6 acquires the noise levels produced by all of the water meters 7.

Thereafter, for each water meter 7 and for each detection period, the first processor module 11 compares the noise level of the detection period with a predetermined noise threshold.

The first processor module 11 detects that there is a water leak in the proximity of a water meter 7 when it detects at least a predetermined number of successive noise levels that are greater than the predetermined noise threshold, said noise levels corresponding to detection periods that are spaced apart in time by at least a predetermined duration.

In this example, the term "a predetermined number of successive noise levels that are greater than the predetermined noise threshold" should be understood as meaning that no detection period with a noise level less than or equal to the predetermined noise threshold is detected among the detection periods associated with said successive noise levels.

In this example, the term "spaced apart in time by at least a predetermined duration" should be understood as meaning that the duration between the beginning of the first of these successive detection periods and the end of the last of these successive detection periods is not less than the predetermined duration.

In this example, the predetermined number is equal to 3.

The predetermined duration is equal to several hours, e.g. 5 hours.

Thus, the fact that the noise level of a detection period is greater than the predetermined noise threshold constitutes only a presumption that there might be a water leak (i.e. it is a hint).

For the first processor module 11 to confirm the presumption that there might be water leak and actually to detect that there is a water leak in the proximity of a water meter 7, the following conditions must be satisfied:

the first processor module 11 must detect at least three (the predetermined number) successive detection periods in which the noise level is greater than the predetermined noise threshold;

the three detection periods must be spaced apart by at least 5 hours (the predetermined duration).

The above-described conditions serve to eliminate pump noise that might be detected in the first measurement samples during certain detection periods.

When the first processor module 11 detects that there is a water leak in the proximity of the water meter 7, the first processor module 11 locates the water leak as being in the distribution network 1 in the proximity of and upstream from the water meter 7 (since the position of the downstream transducer 22b enables it to be effective in detecting a leak of water upstream from the meter 7).

Naturally, it is possible that the first processor module 11 detects a water leak as being in the proximity of a plurality of water meters 7. That might represent a plurality of water leaks, or else a single leak that has been detected from measurements taken by a plurality of water meters 7. The water meter 7 having the highest noise level along the pipework is the meter closest to the water leak. The proximity of a leak is determined by the water meter 7 having the highest noise level, sub-region by sub-region of the network.

The first processor module 11 can thus locate leaks accurately, and can generate an alarm so that action is scheduled to repair the pipe or any other element that has given rise to the leak.

There follows a description in greater detail about the way in which the second processor module 15 of a water meter 7 evaluates the noise level of the leakage noise signal during a detection period.

The nature of leakage noise is known. This noise is quasi-periodic and at low frequency (from 10 hertz (Hz) to a few hundreds of hertz). Other noise is generally at high frequency (1 kHz to 2 kHz) and is generally white noise.

The second processor module 15 acquires the first measurement samples $a_n$ of each detection period, and then applies digital bandpass filtering to the measurement samples of said detection period in order to obtain a filter detection signal comprising first filter measurement samples.

The digital bandpass filtering serves firstly to eliminate any offset, and secondly to select only the frequency band "of interest" (typically lying in the range 10 Hz to 400 Hz) by rejecting noise that is out of band.

The following first filtered measurement samples are obtained at the output of the bandpass filter:

$$S_n = U_n + b_n;$$

where $U_n$ corresponds to the "useful" leakage noise signal and $b_n$ corresponds to the unwanted white noise.

The second processor module 15 of the water meter 7 then calculates the autocorrelation of the filter detection signal. The autocorrelation method is known for enabling periodic information that is buried in noise to be extracted.

The noise level of the filtered leak signal is evaluated using the following formula:

$$M = \text{MAX over } k \left( \sum_{n=0}^{R} S_n \times S_{n-k} \right).$$

where M is the noise level (which corresponds to the power of the filtered leak signal in this example), $S_n$ is the $n^{th}$ first filtered measurement sample, $S_{n-k}$ is the $(n-k)^{th}$ first filtered measurement sample, and R is an integer that is less than or equal to the number of first measurement samples of the detection period (which in this example is equal to 250000, since the duration of the detection period is 5 seconds and the sampling frequency for obtaining the first measurement samples is equal to 50 kHz).

Since the signal $U_n$ is periodic and the noise $b_n$ is centered Gaussian white noise, this formula serves to eliminate the noise $b_n$ and to deduce the power of the leakage noise $U_n$.

This serves to eliminate interfering noise associated with other causes, e.g. the natural flow of water in a pipe: the detecting and locating method is not fooled when the "useful" leakage noise signal is buried in white noise associated with such other causes.

It is important to observe that the detecting and locating method of the invention can be performed with the transducers (22a, 22b) that are also used by the water meter for measuring water consumption, and therefore does not need any additional transducer. The upstream transducer 22a and the downstream transducer 22b are transducers that present high impedance at low frequencies, which enables them to sample the low frequencies that are useful for detecting and locating a leak at a level that is acceptable.

It should also be observed, that in order to perform the detecting and locating method of the invention, it is entirely possible to use second measurement samples coming from the measurements taken by the upstream transducer 22a of each water meter 7. Under such circumstances, when a water leak is detected by the measurements taken by the upstream transducer 22a of a water meter 7, the first processor module 11 of the application server 8 of the IS 6 locates the water leak as being in the water installation 5 to which said water meter 7 is connected, downstream from said water meter 7.

Naturally, the method may be performed using both the first measurement samples and the second measurement samples, thereby improving the accuracy with which water leaks are located.

Naturally, the invention is not limited to the embodiment described, but covers any variant coming within the ambit of the invention as defined by the claims.

Communications between the meters, the gateways, and the IS could be performed using any type of communication technology and any type of protocol.

Some or all of the steps that are described above as being performed in the application server of the IS could be performed in any of the servers of the IS, or else in a gateway connected to the meters, or indeed in a data concentrator connected to the meters, or even in a meter, and in particular in the district smart meter. Likewise, some of the steps that are described above as being performed in the meters (and in particular calculating noise levels), could be performed in other equipment, and for example in any of the servers of the IS, or else in a gateway connected to the meters, or indeed in a data concentrator connected to the meters.

The invention may be performed with fluid meters other than water meters: oil meters, etc.

The invention claimed is:

1. A method of detecting and locating a fluid leak in a fluid distribution network comprising a plurality of ultrasonic fluid meters, each of the plurality of ultrasonic fluid meters comprising an upstream transducer situated beside the fluid distribution network and a downstream transducer situated beside an installation that is fed with fluid by said fluid distribution network, the method comprising, for each of the plurality of ultrasonic fluid meters:
   acquiring or evaluating noise levels, each associated with a respective different detection period, each noise level being representative of a level of a leakage noise signal contained in measurement samples coming from measurements taken by the transducers of said ultrasonic fluid meter during the associated detection period;
   comparing each noise level with a predetermined noise threshold;
   detecting that a fluid leak is present in the proximity of the ultrasonic fluid meter on detecting at least a predetermined number of successive noise levels that are greater than the predetermined noise threshold and that correspond to detection periods that are spaced apart in time by at least a predetermined duration; and
   when a leak is detected, locating said leak as being in the fluid distribution network upstream from said ultrasonic fluid meter,
   wherein the measurement samples used for performing the method comprise first measurement samples that come from measurements taken by the downstream transducer of said ultrasonic fluid meter.

2. The method according to claim 1, wherein the detection periods are defined in such a manner that each detection period follows directly after a preliminary period of duration not less than a predefined duration, and during which the ultrasonic fluid meter measures a fluid consumption of zero.

3. The method according to claim 1, wherein said acquiring or evaluating the noise level for each detection period comprises:
   applying digital bandpass filtering to the measurement samples of said detection period in order to obtain a filtered detection signal comprising filtered measurement samples; and
   calculating the autocorrelation of the filtered detection signal.

4. A non-transitory computer readable storage medium having stored thereon a computer program including instructions for causing an equipment comprising a first communication module and a first processor module to execute the steps of the method according to claim 1.

5. Equipment comprising:
   a first communication module; and
   a first processor module arranged to perform the method according to claim 1.

6. The equipment according to claim 5, wherein the equipment is an information system, or a gateway, or a data concentrator, or a district smart meter.

* * * * *